(12) United States Patent
Li et al.

(10) Patent No.: US 11,601,588 B2
(45) Date of Patent: Mar. 7, 2023

(54) TAKE-OFF CAPTURE METHOD AND ELECTRONIC DEVICE, AND STORAGE MEDIUM

(71) Applicant: BEIJING XIAOMI MOBILE SOFTWARE CO., LTD., Beijing (CN)

(72) Inventors: Guosheng Li, Beijing (CN); Fei Ran, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 17/211,820

(22) Filed: Mar. 25, 2021

(65) Prior Publication Data
US 2022/0038619 A1 Feb. 3, 2022

(30) Foreign Application Priority Data
Jul. 31, 2020 (CN) .......................... 202010762427.0

(51) Int. Cl.
H04N 5/232 (2006.01)
G06V 40/20 (2022.01)
G06V 40/16 (2022.01)

(52) U.S. Cl.
CPC ....... *H04N 5/23219* (2013.01); *G06V 40/172* (2022.01); *G06V 40/20* (2022.01); *H04N 5/23245* (2013.01); *H04N 5/232935* (2018.08)

(58) Field of Classification Search
None
See application file for complete search history.

(56) References Cited

U.S. PATENT DOCUMENTS

2011/0050722 A1* 3/2011 Muraki ............... H04N 5/2625
345/545
2011/0128397 A1* 6/2011 Kang ................. H04N 5/23216
348/222.1

(Continued)

FOREIGN PATENT DOCUMENTS

| CN | 105409195 B | 8/2019 |
| CN | 105554400 B | 11/2019 |
| WO | 2017215501 A1 | 12/2017 |

OTHER PUBLICATIONS

Garcia Cecilia et al. "Automatic Jumping Photos on Smartphones", 2014 IEEE International Conference on Image Processing (ICIP), IEEE, Oct. 27, 2014 (Oct. 27, 2014), pp. 2522-2526, XP032967078, DOI: 10. 1109/ICIP.2014.7025510.

(Continued)

*Primary Examiner* — Cynthia Segura
(74) *Attorney, Agent, or Firm* — Syncoda LLC; Feng Ma

(57) ABSTRACT

A take-off capture method includes: acquiring, in response to obtaining an image capturing operation triggered by a user prior to taking off, image frames within a designated duration, upon entering a take-off capture mode; filtering at least one designated image frame based on the acquired image frames, the designated image frame being an image frame where the user is at a take-off high point within the designated duration; and performing an image capturing operation and outputting a take-off capture image based on the designated image frame, when an acquiring time period does not reach the designated duration but the designated image frame is filtered based on the acquired image frames, or when an acquiring time period reaches the designated duration. The user can therefore easily and quickly obtain the take-off capture image with the best take-off posture captured by the user in the take-off process.

20 Claims, 4 Drawing Sheets

(56) References Cited

U.S. PATENT DOCUMENTS

| | | | | |
|---|---|---|---|---|
| 2011/0304774 | A1* | 12/2011 | Latta | G06F 16/783 |
| | | | | 707/E17.123 |
| 2014/0354845 | A1* | 12/2014 | Molgaard | H04N 5/2621 |
| | | | | 348/222.1 |
| 2015/0063636 | A1* | 3/2015 | Jin | G06V 40/161 |
| | | | | 382/103 |
| 2015/0189142 | A1* | 7/2015 | Kang | H04N 9/8227 |
| | | | | 348/135 |
| 2016/0337582 | A1* | 11/2016 | Shimauchi | H04N 5/232941 |
| 2017/0177930 | A1* | 6/2017 | Holohan | G06T 7/251 |
| 2017/0278288 | A1* | 9/2017 | Suzuki | G06T 7/74 |
| 2021/0281747 | A1* | 9/2021 | Weber | H04N 5/23232 |

OTHER PUBLICATIONS

Andrew Maxwell-Parish: "Automatically-Take-Perfect-Jump-Shots", Sep. 23, 2013 (Sep. 23, 2013), XP055834752, Retrieved from the Internet: URL; https://content.instructables.com/pdfs/EZZ/CFEF/HLSHEIJ0/Automatically-Take-Perfect-Jump-Shots.pdf.
Extended European Search Report in European application No. 21165100.5 dated Sep. 6, 2021.

* cited by examiner

TAKE-OFF CAPTURE METHOD AND ELECTRONIC DEVICE, AND STORAGE MEDIUM

CROSS-REFERENCE TO RELATED APPLICATION

This disclosure claims priority to Chinese Patent Application No. 202010762427.0 filed on Jul. 31, 2020, the disclosure of which is hereby incorporated by reference in its entirety.

BACKGROUND

Users often take many pictures with their mobile terminals. For example, when users are playing outdoors, they often want to take photos with a take-off (e.g., jumping, leaping) posture.

SUMMARY

The present disclosure generally relates to the field of image capture technology, and more specifically, to a take-off capture method and electronic device, and a storage medium.

According to a first aspect of the embodiments of the present disclosure, there is provided a take-off capture method, including: acquiring, in response to obtaining an image capturing operation triggered by a user prior to taking off, image frames within a designated duration, upon entering a take-off capture mode; filtering at least one designated image frame based on the acquired image frames, the designated image frame being an image frame where the user is at a take-off high point within the designated duration; and performing an image capturing operation and outputting a take-off capture image based on the designated image frame, when an acquiring time period does not reach the designated duration but the designated image frame is filtered based on the acquired image frames, or when an acquiring time period reaches the designated duration.

In some embodiments, the designated image frame includes at least two image frames, and the at least two image frames include: a first number of image frames in order of take-off high points from high to low, in multiple image frames; or an image frame where the user is at the highest point of take-off and a second number of image frames adjacent to the image frame where the user is at the highest point of take-off, in the multiple image frames; or a third number of image frames adjacent to the image frame where the user is at the highest point of take-off, in the multiple image frames; and the outputting a take-off capture image based on the designated image frame includes: synthesizing and outputting the take-off capture image, based on the at least two image frames.

In some embodiments, filtering the designated image frame based on the acquired image frames includes: caching the acquired image frames to a face recognition cache region and an original image buffer; and invoking, in response to caching newly acquired image frames in the face recognition cache region and/or the original image buffer, a sliding frame-selection algorithm to filter the designated image frame with designated sliding windows.

In some embodiments, the filtering the designated image frame with designated sliding windows includes: performing content recognition on the image frames in each sliding window in turn, and obtaining coordinate information of corresponding content; and determining, in response to obtaining a peak coordinate representing the highest take-off height based on the coordinate information within the designated duration, an image frame corresponding to the peak coordinate, and/or a designated number of image frames adjacent to the image frame corresponding to the peak coordinate as the designated image frame; or determining, in response to not obtaining a peak coordinate representing the highest take-off height based on the coordinate information within the designated duration, an image frame in the latest sliding window as the designated image frame.

In some embodiments, the performing content recognition on the image frames in each sliding window includes: performing a tracking recognition of human body on the image frames in each sliding window, and/or performing a predetermined part recognition of human body on the image frames in each sliding window.

In some embodiments, the predetermined part includes human eyes and/or human face.

In some embodiments, the outputting a take-off capture image based on the designated image frame includes: synthesizing the designated image frame through a multi-frame noise reduction algorithm and outputting the take-off capture image.

In some embodiments, the take-off capture method further includes: reducing an exposure table corresponding to standard exposure parameters of a current image capturing scene, prior to entering the take-off capture mode to start acquiring the image frames.

In some embodiments, the taking-off capture method further includes: displaying and caching preview pictures in real time, in response to entering the take-off capture mode.

According to a second aspect of the embodiments of the present disclosure, there is provided an electronic device, including: an acquisition component, configured to acquire, in response to obtaining an image capturing operation triggered by a user prior to taking off, image frames within a designated duration, upon entering a take-off capture mode; a filtering component, configured to filter at least one designated image frame based on the acquired image frames, the designated image frame being an image frame where the user is at a take-off high point within the designated duration; and a processing component, configured to perform an image capturing operation and output a take-off capture image based on the designated image frame, when an acquiring time period does not reach the designated duration but the designated image frame is filtered based on the acquired image frames, or when an acquiring time period reaches the designated duration.

In some embodiments, the designated image frame includes at least two image frames, and the at least two image frames include: a first number of image frames in order of take-off high points from high to low, in multiple image frames; or an image frame where the user is at the highest point of take-off and a second number of image frames adjacent to the image frame where the user is at the highest point of take-off, in the multiple image frames; or a third number of image frames adjacent to the image frame where the user is at the highest point of take-off, in the multiple image frames; and the processing component is further configured to synthesize and output the take-off capture image based on the at least two image frames.

In some embodiments, the filtering component is configured to: cache the acquired image frames to a face recognition cache region and an original image buffer; and invoke, in response to caching newly acquired image frames in the face recognition cache region and/or the original image buffer, a sliding frame-selection algorithm to filter the designated image frame with designated sliding windows.

In some embodiments, the filtering component is configured to: perform content recognition on the image frames in each sliding window in turn, and obtain coordinate information of corresponding content; and determine, in response to obtaining a peak coordinate representing the highest take-off height based on the coordinate information within the designated duration, an image frame corresponding to the peak coordinate, and/or a designated number of image frames adjacent to the image frame corresponding to the peak coordinate as the designated image frame; or determine, in response to not obtaining a peak coordinate representing the highest take-off height based on the coordinate information within the designated duration, an image frame in the latest sliding window as the designated image frame.

In some embodiments, the filtering component is configured to: perform a tracking recognition of human body on the image frames in each sliding window, and/or perform predetermined part recognition of human body on the image frames in each sliding window.

In some embodiments, the predetermined part includes human eyes and/or human face.

In some embodiments, the processing component is configured to synthesize the designated image frame through a multi-frame noise reduction algorithm and output the take-off capture image.

In some embodiments, the electronic device further includes an exposure table adjustment component, and the exposure table adjustment component is configured to reduce an exposure table corresponding to standard exposure parameters of a current image capturing scene, prior to entering the take-off capture mode to start acquiring the image frames.

In some embodiments, the electronic device further includes a cache component, and the cache component is configured to display and cache preview pictures in real time, in response to entering the take-off capture mode.

According to a third aspect of the embodiments of the present disclosure, there is provided an electronic device, including a processor; and memory for storing processor executable instructions; wherein the processor is configured to invoke the instructions to execute the take-off capture method described in the first aspect or any implementation of the first aspect of the present disclosure.

According to a fourth aspect of the embodiments of the present disclosure, there is provided a non-transitory computer-readable storage medium, when instructions in the storage medium are executed by a processor of a mobile terminal, enabling the mobile terminal to execute the take-off capture method described in the first aspect or any implementation of the first aspect of the present disclosure.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this description, illustrate embodiments consistent with the disclosure and, together with the description, serve to explain the principles of the disclosure.

DETAILED DESCRIPTION

Figure 1:
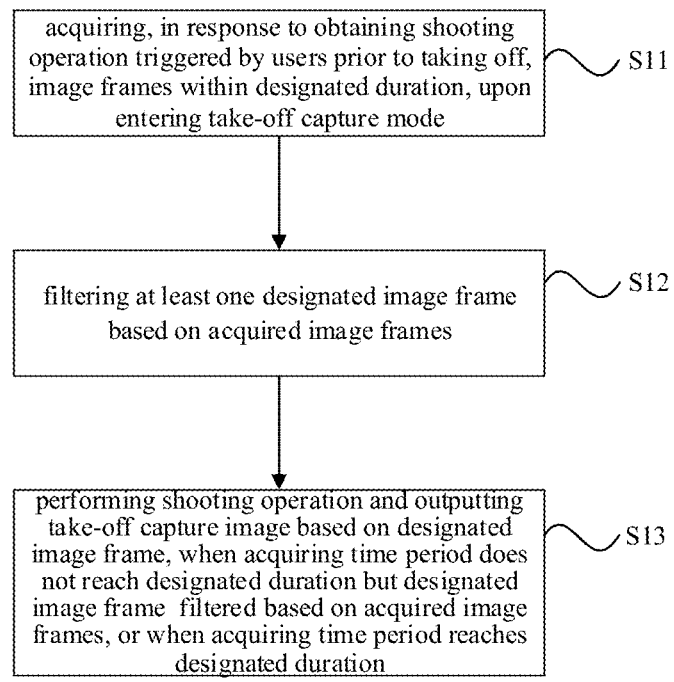
FIG. 1 is a flowchart showing a take-off capture method according to some embodiments.

Description will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

For the photos of the take-off posture, the photos taken when a user is at a highest point (e.g., top, or apogee) in the air can be considered as photos with the best take-off posture.

However, it may be difficult to capture a photo of the user when the user jumps to the top due to the mismatch between the time when the user presses the image capturing button and the time when the user reaches the top of jump, and the internal delay of the camera system.

That is, because the time when the user presses the image capturing button and the time when the user reaches the top of the take-off do not match, together with the internal delay of the camera system, the persons in the photos are often not located at the highest point of take-off, and the user often needs to make multiple attempts in order to capture a satisfactory take-off photo.

At present, the continuous image capturing (shooting) function of the image capturing component of the existing mobile terminal can meet the above-mentioned image capturing needs of users to a certain extent. However, there are still some shortcomings in the continuous image capturing function, for example, the image capturing is not smart enough, that is, the user needs to manually select the photos with better take-off effect from the multiple photos taken in succession; in addition, the number of users who know that the continuous image capturing function of the image capturing component can take the take-off photos is relatively small, which leads to the popularity of using the continuous image capturing function of the image capturing component to take the take-off photos is not high.

A take-off capture method is provided by the present disclosure, the take-off capture mode is entered and image frames are acquired, in response to obtaining an image capturing operation triggered by the user prior to taking off, the designated image frame is filtered based on the acquired image frames, and the take-off capture image is output based on the designated image frame. The take-off capture method of the present disclosure can ensure that the take-off capture image is the image with the best take-off posture captured by the user during the take-off process, thereby ensuring that the user can easily and quickly obtain the take-off capture image with the best take-off posture.

The take-off capture method provided by the embodiments of the present disclosure can be applied to a terminal, and the terminal can be a mobile terminal such as a smart phone, a tablet computer, and the like with an image acquiring function and an image processing function. In addition, the take-off capture method provided by the embodiments of the present disclosure can also be applied to the image capturing component, for example, single-lens reflex (SLR) camera, micro single camera, etc.

FIG. 1 is a flowchart showing a take-off capture method according to some embodiments. As shown in FIG. 1, the take-off capture method includes steps S11-S13 and each step will be described separately below.

In step S11, in response to obtaining an image capturing operation triggered by a user prior to taking off, image frames within a designated duration is acquired, upon entering a take-off capture mode.

In some embodiments, the image capturing operation can be used to trigger the terminal to enter the take-off (e.g., jump) capture mode, that is, when the electronic device detects the image capturing operation, it enters the take-off capture mode.

In some embodiments, the image capturing operation can be clicking a specific button on an image capturing interface. That is, in the image capturing interface provided by the electronic device, an image capturing button corresponding to the take-off capture mode can be set. When the user clicks the image capturing button, the electronic device can obtain the corresponding image capturing operation and enter the take-off (jump) capture mode.

In some embodiments, the image capturing operation can be a specific gesture operation on the image capturing interface, such as sliding in a predetermined direction, sliding up to a predetermined position, etc. When the electronic device detects the specific gesture operation on the image capturing interface, it enters the take-off snapshot mode.

In some embodiments, the user can be the target being captured by the camera of the electronic device. For example, the user can place the electronic device on a tripod or on another object, sets the take-off capture mode with a specified delay time, and then move to the field of view of the camera of the electronic device, and then jump at the time of the specified delay time lapses, aided by audio and/or visual cues from the electronic device.

In some other embodiments, the user/target can trigger the take-off mode with a wearable device, such as a smart watch, that is in communication with the electronic device.

In yet some other embodiments, the user/target can trigger the take-off mode with a voice command on the electronic device.

In some other embodiments, the electronic device can recognize gesture commands by the user/target from a distance. For example, the user/target can use a hand gesture such as a "V" sign to signal the electronic device that the user/target is about to jump, or use a body gesture such as bending forward as a gesture command. The electronic device can use image recognition to receive the gesture command, and enter the take-off capture mode.

In some embodiments, the user and the target being captured can be different entities, and the user can trigger the take-off capture mode while signaling the target to jump.

In the application process, the user can trigger the image capturing operation before taking off.

In response to obtaining the image capturing operation triggered by the user, before taking off, the take-off capture mode can be entered. Also, image frames are acquired via the take-off capture mode. Herein, the pictures of the acquired image frames can include the people to be photographed who are taking off.

Since the user triggers the image capturing operation before taking off, the acquired image frames include at least the process that the user moves from the lowest point to the highest point during the take-off process. In a possible example, the acquired image frames can also include a process in which the user moves from the lowest point to the highest point during the take-off process, and then falls back to the lowest point. It can be understood that the positions of the people to be photographed in respective pictures of the acquired image frames can constitute a parabola with an opening downward.

In step S12, at least one designated image frame is filtered based on the acquired image frames. Herein, the designated image frame is the image frame where the user is at the take-off high point within the designated duration.

In some embodiments, since the ideal take-off capture image is an image frame that the people to be photographed are located at the highest point of jump, the designated image frames can include at least the image frame corresponding to the highest point of jump which the people to be photographed move to. In another possible example, if the image frame corresponding to the highest point of jump which the people to be photographed move to is not acquired, the designated image frames can also include at least image frames that the people to be photographed move to close to the highest point of jump, for example, now let the fourth image frame be the image frame corresponding to the highest point of jump which the people to be photographed move to, then the designated image frame can also be at least one image frame of the second image frame, the third image frame, the fifth image frame and the sixth image frame.

In step S13, an image capturing operation is performed and a take-off capture image is output based on the designated image frame, when an acquiring time period does not reach the designated duration but the designated image frame is filtered based on the acquired image frames, or when an acquiring time period reaches the designated duration.

In some embodiments, if the acquiring time period has not reached the designated duration but the designated image frame has been filtered based on the acquired image frames, the image capturing operation is performed and the take-off capture image is output based on the filtered designated image frame. Since the take-off capture image is determined based on the designated image frame filtered out in the take-off capture mode, it can be ensured that the take-off capture image is an image with the best take-off posture captured by the user during the take-off process.

Taking the designated duration of 2 s as an example now, when the designated image frame has been filtered out after entering the take-off capture mode 1.5 s, the operation of acquiring the image frames can be stopped, and it is triggered to perform the image capturing operation based on the designated image frame which is filtered out. Further, the take-off capture image can be output based on the designated image frame. In this way, the acquired image frames can be reduced. On the one hand, it can effectively reduce the terminal memory occupied by the acquired image frames, on the other hand, it can also reduce the amount of system calculations consumed in the process of acquiring image frames, and then raise the running speed of the terminal and bring a good user experience to users.

In some embodiments, if the acquiring time period has reached the designated duration, the image capturing operation is performed, and the take-off capture image is output based on the filtered designated image frame. Herein, the designated image frame can be an image frame that the people to be photographed move to close to the highest point of take-off. It should be noted that the designated image frame can be one frame or multiple frames.

Now still taking the designated duration of 2 s as an example, when entering the 2nd second of the take-off capture mode, it indicates that the acquiring time period has reached the designated duration, and the image capturing operation needs to be performed. The designated image frame is filtered out based on the acquired image frames, and further, the take-off capture image is output based on the designated image frame.

It should be noted that in order to ensure that the acquired image frame contains the image frame corresponding to the highest point of take-off which the user moves to, it is necessary to collect all the image frames of the user during the take-off process.

According to experience, the time period spent by users from taking off to falling down is about 1 s-1.5 s. Therefore, the designated image frame for outputting the take-off capture image can be filtered based on the image frames acquired within the designated duration longer than 1.5 s. In this way, it can be ensured that the acquired image frame contains the image frame corresponding to the highest point of take-off which the user moves to, which lays a foundation for filtering the designated image frame for outputting the take-off capture image. Herein, the designated duration can also be determined according to actual situations, and in this disclosure, the designated duration is not limited specifically.

The following embodiments are used to illustrate the take-off capture method of the present disclosure.

Figure 2:
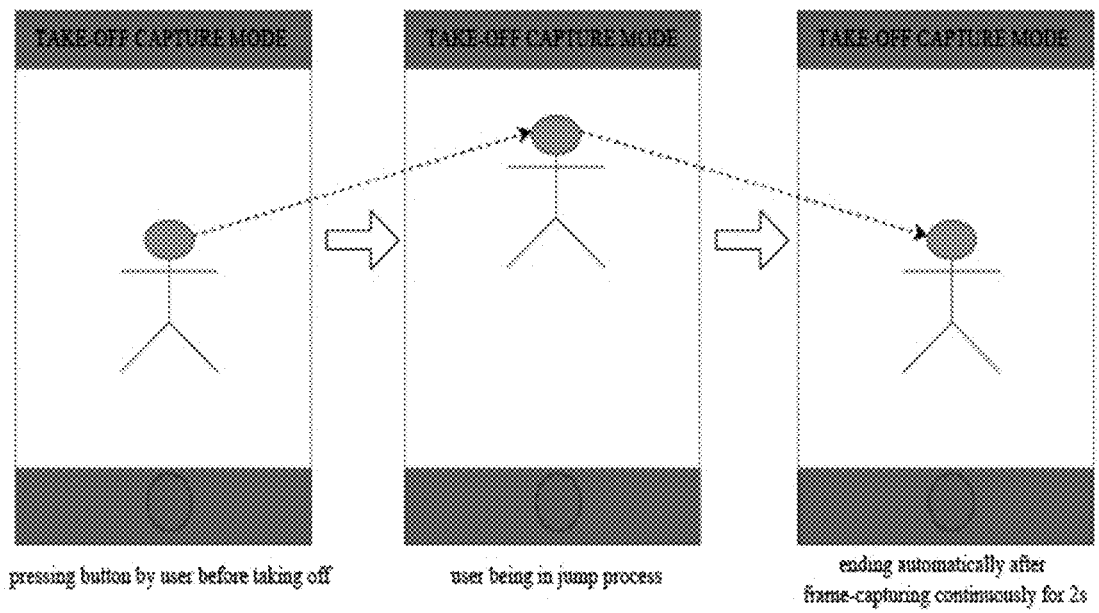
FIG. 2 is a schematic diagram showing an operation of a take-off capture method according to some embodiments.

FIG. 2 is a schematic diagram showing an operation of a take-off capture method according to some embodiments.

As shown in FIG. 2, when it is detected that the user clicks the button for the take-off capture operation before taking off, it means that the user has started the take-off capture operation. At this time, the take-off capture mode can be entered and the image frames can be acquired in the take-off capture mode.

Furthermore, it is possible to acquire the image frames that the user is in the jump process within a designated duration (for example, 2 s), and filter the designated image frame for outputting the take-off capture, in the acquired image frames.

In some embodiments, the designated image frame can be a single image frame, for example, the designated image frame can be the image frame corresponding to the highest point which the user jumps to (as shown in the second sub-figure in FIG. 2), alternatively, the designated image frame can also be a corresponding image frame that the user moves to close to the highest point of jump, and the take-off capture image is output based on the designated image frame. In some embodiments, the designated image frame can also be multiple image frames, that is, the image frame that the user takes off to the highest point and the adjacent image frames before and after the image frame that the user takes off to the highest point, and the take-off capture image is output based on the multiple designated image frames. It should be noted that outputting the take-off capture image based on the multiple designated image frames can reduce the noise of the take-off capture image and improve the clarity of the take-off capture image.

In the take-off capture method provided by the present disclosure, the take-off capture mode is entered and image frames are acquired, in response to obtaining an image capturing operation triggered by an user prior to taking off, the designated image frame is filtered based on the acquired image frames, and the take-off capture image is output based on the designated image frame. Since the take-off capture image is determined based on the designated image frame filtered out in the take-off capture mode, it can be ensured that the take-off capture image is the image with the best take-off posture captured by the user during the take-off process, thereby ensuring that the users can easily and quickly obtain the take-off capture image with the best take-off posture.

In various embodiments of the present disclosure, the designated image frame can include at least two image frames.

In some embodiments, the aforementioned at least two image frames can include a first number of image frames in order of the take-off high points from high to low, in multiple image frames. For example, still let the fourth image frame be the image frame corresponding to the highest point of jump which the people to be photographed move to, then the fourth image frame, the third image frame, the second image frame and the first image frame, or the fourth image frame, the fifth image frame, the sixth image frame and the seventh image frame are the image frames in order of the take-off high points from high to low. If the first number of image frames are three image frames, the at least two image frames can include the fourth image frame, the third image frame, and the second image frame; or, the fourth image frame, the fifth image frame, and the sixth image frame.

It should be noted that the first number can be determined according to actual situations. In this disclosure, the first number is not limited specifically.

In some embodiments, the at least two image frames can also include the image frame where the user is at the highest point of take-off and the second number of image frames adjacent to the image frame where the user is at the highest point of take-off, in the multiple image frames. Continue to take the above fourth image frame as the image frame corresponding to the highest point of jump which the people to be photographed move to, as an example, if the second number of image frames are two image frames, at least two image frames can include the second image frame to the sixth image frame.

Herein, the second number can be determined according to actual situations, and in this disclosure, the second number is not limited specifically.

In some embodiments, the at least two image frames can further include a third number of image frames adjacent to the image frame where the user is at the highest point of take-off, in the multiple image frames. Continue to take the above fourth image frame as the image frame corresponding to the highest point of jump which the people to be photographed move to, as an example, if the third number of image frames are two image frames, at least two image frames can include the second image frame, the third image frame, the fifth image frame and the sixth image frame.

Herein, the third number can be determined according to actual situations. In this disclosure, the third number is not limited specifically.

In some embodiments, outputting the take-off capture image based on the designated image frame can be implemented in the following manner.

In the application process, the take-off capture image can be synthesized and output based on at least two image frames.

The take-off capture image is output based on at least two image frames, which can reduce the noise of the take-off capture image, and improve the clarity of the take-off capture image. The process of filtering the designated image frame based on the acquired image frames will be illustrated through the following embodiments in the present disclosure.

Figure 3:
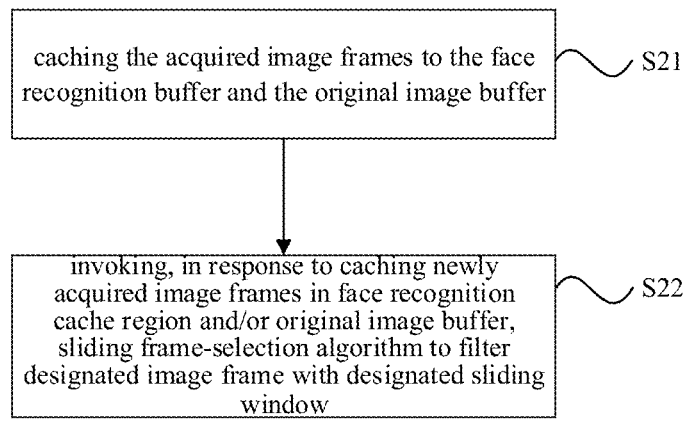
FIG. 3 is a flowchart showing a process of filtering a designated image frame based on acquired image frames according to some embodiments.

FIG. 3 is a flowchart showing a process of filtering the designated image frame based on acquired image frames according to some embodiments.

In some embodiments of the present disclosure, as shown in FIG. 3, filtering the designated image frame for outputting the take-off capture image based on the acquired image frames includes step S21 and step S22. The steps are described separately below.

In step S21, the acquired image frames are cached to the face recognition cache region and the original image buffer.

After entering the capture mode, the acquired image frames can be cached in the face recognition cache region and the original image buffer.

In some embodiments, the image frames cached in the face recognition cache region and the image frames cached in the original image buffer can correspond to each other. Herein, the image frame cached in the face recognition cache region can be used to identify the content in the image frame later, and determine the coordinate information of the corresponding content; and the image frame cached in the original image buffer is the original image of the acquired image frame, and it can be a material library for filtering the designated image frame.

In step S22, in response to caching the newly acquired image frames in the face recognition cache region and/or the original image buffer, a sliding frame-selection algorithm is invoked to filter the designated image frame with designated sliding windows.

In some embodiments, when the newly acquired image frames are cached in the face recognition cache region and/or the original image buffer, the newly acquired image frames will be transmitted to the sliding window in real time and in sequence. Based on the image frames stored in the current sliding window, the sliding frame-selection algorithm is used to filter the designated image frame for outputting the take-off capture image.

It should be noted that the length of the sliding window can be a designated number of image frames. Herein, the designated number of image frames can be determined according to actual situations, for example, it can be five image frames. In the present disclosure, the length of the sliding window is not limited specifically.

In the application process, the sliding window can save the image frames currently stored in the sliding frame-selection window. Taking the length of the sliding window of five image frames as an example, in the first sliding window, if the image frames stored in the first sliding window include the second to sixth image frames, the first image frame will not be saved; in the second sliding window, if the image frames stored in the second sliding window include the third to seventh image frames, the first and second image frames will not be saved. Since the sliding window can clear the previously useless image frames in real time, it can effectively reduce the space occupied by the memory, improve the operating speed of the terminal, and increase the user experience.

Since the take-off capture image is synthesized and output based on the designated image frame in the take-off capture method of the present disclosure, the designated image frame can have an important influence on the take-off capture image to be formed. The process of filtering the designated image frame with specified sliding windows will be illustrated through the following embodiments in the present disclosure.

Figure 4:
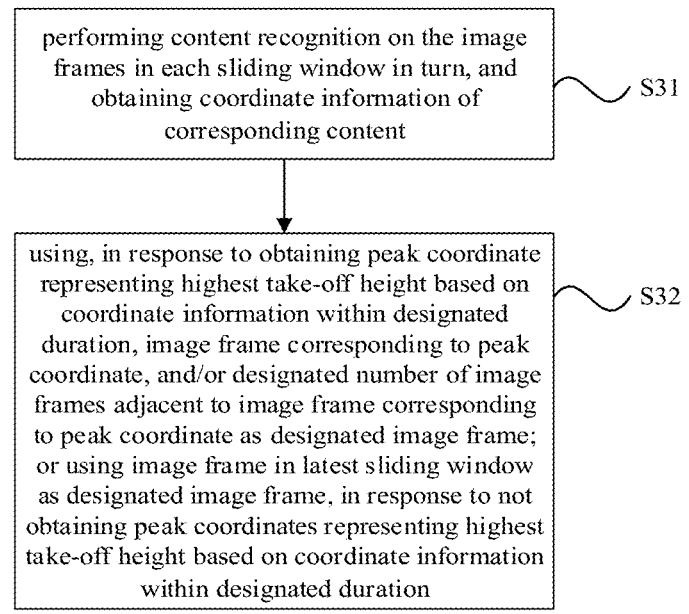
FIG. 4 is a flowchart showing a process of filtering a designated image frame with designated sliding windows according to some embodiments.

FIG. 4 is a flowchart showing a process of filtering a designated image frame with designated sliding windows according to some embodiments.

In some embodiments of the present disclosure, as shown in FIG. 4, filtering the designated image frame for outputting the take-off capture image with designated sliding windows includes step S31 and step S32. The steps are described separately below.

In step S31, content recognition is performed on the image frames in each sliding window in turn, and coordinate information of the corresponding content is obtained.

In a possible embodiment, performing the content recognition on the image frames in each sliding window includes: performing a tracking recognition of human body on the image frames in each sliding window, and/or performing a predetermined part recognition of human body on the image frames in each sliding window.

Herein, the coordinate information of the content corresponding to the content of the human body is the coordinate information of the human body of the people to be photographed; and the coordinate information of the content corresponding to the content of the predetermined part of the human body is the coordinate information of the predetermined part of the human body of the people to be photographed.

In some embodiments, the human body of the people to be photographed in each image frame in the sliding window can be recognized, and the coordinate information of the human body in each image frame can be determined respectively. If it is determined that the coordinates of the human body of the people to be photographed are (X1, Y1), then Y1 can represent the take-off height of the people to be photographed in the image frame.

Further, the image frame with the largest take-off height Y1 of the people to be photographed in all the image frames can be determined, based on Y1 representing the take-off height of the people to be photographed in the image frame, and the image frame can be determined as the designated image frame.

In some embodiments, the predetermined part of the human body of the people to be photographed in each image frame in the sliding window can be recognized, and the coordinate information of the predetermined part of the human body in each image frame can be determined respectively. If it is determined that the coordinates of the predetermined part of the human body of the people to be photographed are (X2, Y2), then Y2 can represent the take-off height of the people to be photographed in the image frame.

Since the determination of the designated image frame based on the coordinate information of the predetermined part of the human body has the same principle as the above determination of the designated image frame based on the coordinate information of the human body, it will not be repeated here.

Further, the predetermined part of the people to be photographed can include at least human eyes or human faces. Herein, the predetermined part can also be determined according to actual situations, and it can be the nose, ears, mouth, etc., and the predetermined part is not limited specifically in the present disclosure.

In step S32, in response to obtaining a peak coordinate representing the highest take-off height based on the coordinate information within the designated duration, an image frame corresponding to the peak coordinate, and/or a designated number of image frames adjacent to the image frame corresponding to the peak coordinate are used as the designated image frames; or, the image frames in the latest sliding window are used as the designated image frames, in response to not obtaining a peak coordinate representing the highest take-off height based on the coordinate information within the designated duration.

In some embodiments, if within a designated duration, the peak coordinate representing the highest take-off height of the people to be photographed is obtained, based on the face coordinate information in the acquired image frames, the image frame corresponding to the peak coordinate, and the image frames adjacent to the image frame can be used as the designated image frame. The take-off capture image is obtained based on the designated image frame, so as to ensure that the position of the people to be photographed in the obtained take-off capture image can be closer to the highest point of the jump of the people to be photographed.

In order to facilitate the explanation of this example, the following examples are used for description.

Figure 5:
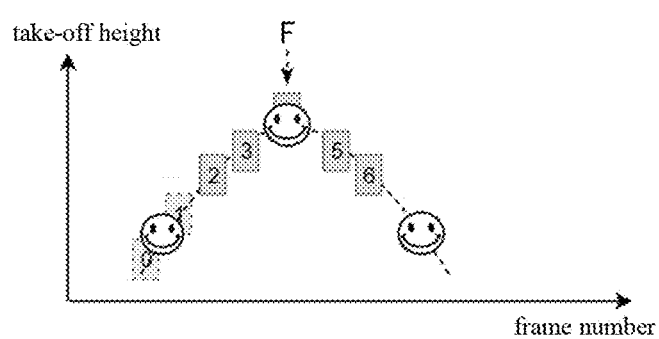
FIG. 5 is a schematic diagram showing an operation of filtering a designated image frame according to some embodiments.
Figure 6:
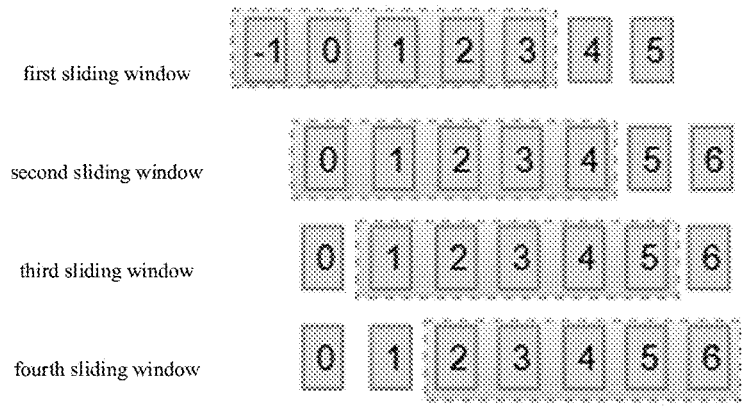
FIG. 6 is a schematic diagram showing an operation of updating image frames of sliding windows corresponding to FIG. 5 according to some embodiments.

FIG. 5 is a schematic diagram showing an operation of filtering a designated image frame according to some embodiments; and FIG. 6 is a schematic diagram showing an operation of updating image frames of sliding windows corresponding to FIG. 5 according to some embodiments.

With reference to FIGS. 5 and 6, it can be understood that in the first sliding window, the first sliding window includes an image frame where the user does not take off (corresponding to "−1" frame in FIG. 6) to the third image frame. Since the designated image frame is not found by comparing the coordinates representing the take-off height of the people to be photographed in each image frame, the image frame newly cached in the face recognition cache region is continuously transmitted to the sliding window. It should be noted that after the image frame newly cached in the face recognition cache region is transmitted to the sliding window, a second sliding window can be formed.

In the second sliding window, the second sliding window includes the $0^{th}$ image frame to the fourth image frame. Since the designated image frame has not been found, it is necessary to continue to transmit the image frame newly cached in the face recognition cache region to the sliding window. At this time, a third sliding window can be formed.

In the third sliding window, the third sliding window includes the first image frame to the fifth image frame. Since the coordinate representing the take-off height of the people to be photographed in the fourth image frame is greater than the coordinates representing the take-off height of the people to be photographed in the third and fifth image frames, it can be understood that the take-off height of the people to be photographed in the fourth image frame is the peak value F of the take-off height of the people to be photographed in the image frames acquired within a designated duration. That is to say, it is indicated that the people to be photographed in the fourth image frame have taken off to the highest point in the take-off process. Therefore, the fourth image frame can be determined as the designated image frame.

In order to enable the captured take-off image to be clearer, the captured take-off image can be determined based on multiple image frames.

In some embodiments, in addition to the fourth image frame described above, the designated image frames also include a designated number of adjacent image frames before and after the fourth image frame. Herein, the designated number can be determined according to actual situations, for example, it can be two frames. In the present disclosure, the designated number is not limited specifically.

In combination with the above description, in addition to the fourth image frame shown in FIG. 5 or FIG. 6, the designated image frames can also include the second image frame, the third image frame, the fifth image frame, and the sixth image frame. Continuing the third sliding window described above, since the third sliding window has not yet saved the sixth image frame, it is necessary to continue to transmit the latest image frame cached in the face recognition cache region to the sliding window. At this time, a fourth sliding window can be formed. The sixth image frame is obtained through the fourth sliding window.

After obtaining the sixth image frame, it means that the designated image frames have been filtered out. Further, it is possible to perform an image capturing operation, and synthesize and output the take-off capture image based on the designated image frame.

In some embodiments, if within a designated duration, the peak coordinate representing the highest take-off height of the people to be photographed has not been obtained, based on the face coordinate information in the acquired image frames, the image frame in the latest sliding window can be used as the designated image frame.

In some embodiments, when the designated duration is reached, if the image frames in the latest sliding window are the 24th to 28th image frames respectively, these five image frames can be used as the designated image frames. And the take-off capture images are synthesized and output based on the designated image frames.

Since the take-off capture image obtained based on a single frame image often has noise, the take-off capture image can be obtained by synthesizing multiple image frames to reduce the noise of the take-off capture image. The process of synthesizing a take-off capture image based on multiple designated image frames will be illustrated through the following embodiments in the present disclosure.

In some embodiments of the present disclosure, the multiple designated image frames can be synthesized by a multi-frame noise reduction algorithm to output the take-off capture image.

Since the multiple designated image frames are adjacent image frames, the pictures between the image frames can be closer and the noise in their own image frames can be complemented with each other. Further, multiple designated image frames are synthesized by a multi-frame noise reduction algorithm and the take-off capture image obtained by noise reduction is output, thereby reducing the noise of the formed take-off capture image and improving the clarity of the take-off capture image.

In the application process, the captured object is moving people to be photographed. Because the people to be photographed often have motion blur during movement, in order to solve this problem, it can be achieved by adjusting the exposure parameters of the acquired image frame. The process of solving the problem of motion blur by adjusting the exposure parameters of the acquired image frame will be described through the following embodiments in the present disclosure.

In some embodiments of the present disclosure, the take-off capture method further includes reducing an exposure table corresponding to standard exposure parameters of a current image capturing scene, prior to entering the take-off capture mode to start acquiring the image frames.

In the process of acquiring image frames, the exposure parameters corresponding to different image capturing scenes are not the same. In the application process, the exposure table regarding the correspondence between the image capturing scene and the exposure parameters can be set in advance. When it is detected that the current image capturing scene is A, the exposure parameters corresponding to the image capturing scene A can be found based on the exposure table.

Since long exposure may cause motion blur, the exposure table corresponding to the standard exposure parameters of the current image capturing scene can be reduced prior to entering the take-off capture mode to start acquiring the image frames. In the application process, the exposure parameters corresponding to respective image capturing scenes in the exposure table can be reduced to one-half of the original exposure parameters.

As a possible embodiment, the exposure parameters corresponding to respective image capturing scenes in the exposure table can also be reduced to one third of the original exposure parameters. In the present disclosure, the amount of reduction of the exposure parameters can be adjusted based on actual situations. In the present disclosure, the amount of reduction of the exposure parameters is not limited specifically.

In some embodiments of the present disclosure, the take-off capture method further includes displaying and caching preview pictures in real time in response to entering the take-off capture mode. In this way, the user can preview each image frame in the process of acquiring image frames, which improves the user experience during use, and each image frame cached can also enable the user to manually select the desired image frames.

In order to further explain the take-off capture method of the present disclosure, the following examples are used for description.

Figure 7:
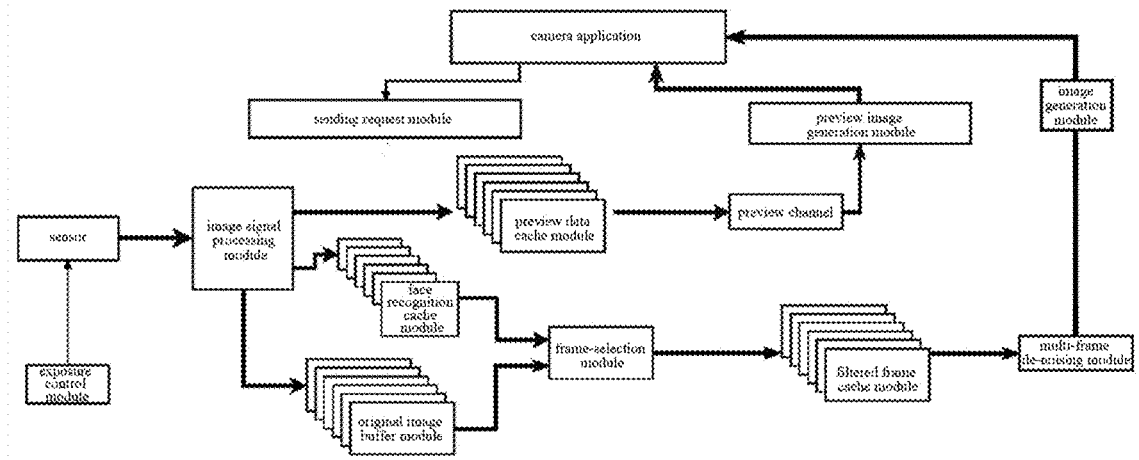
FIG. 7 is a block diagram showing a system for applying a take-off capture method according to some embodiments.

FIG. 7 is a block diagram showing a system for applying a take-off capture method according to some embodiments.

In some embodiments, as shown in FIG. 7, in response to a user's request for a take-off capture, before entering the take-off capture mode to start acquiring the image frames, the exposure parameters corresponding to the current image capturing scene are reduced by an exposure control component to obtain a short exposure table.

Further, a sensor will acquire image frames based on the short exposure table, and after being processed by an image signal processing component, the acquired image frames can be sequentially cached to the face recognition cache component and the original image buffer component.

In response to the newly acquired image frames cached in the face recognition cache region and/or the original image buffer, the designated image frame is filtered with the designated sliding window, through invoking the sliding frame-selection algorithm by a frame-selection component. Herein, the designated image frame is used to synthesize and output the take-off capture image.

Further, the filtered multiple designated image frames are cached in a filtered frame cache component, and the designated image frames are merged and de-noised through a multi-frame de-noising component, so as to form and output the take-off capture image. Herein, the formed take-off capture image can be returned to a camera application for users to watch.

It should be noted that the user can also make a request to preview the take-off capture. In response to the preview request, the image frames processed by an image signal processing component can also be cached in the preview data cache component, and the preview image is generated through a preview channel and a preview image generation component in turn. The generated preview image is provided through the camera application for users to preview.

It can be understood from the above description that the take-off capture method is provided by the present disclosure, the take-off capture mode is entered and image frames are acquired, in respond to obtaining an image capturing operation triggered by the user before taking off, the designated image frame is filtered based on the acquired image frames, and the take-off capture image is output based on the designated image frame. Since the take-off capture image is determined based on the designated image frame filtered out in the take-off capture mode, it can be ensured that the take-off capture image is the image with the best take-off posture captured by the user during the take-off process, thereby ensuring that the user can easily and quickly obtain the take-off capture image with the best take-off posture.

Based on the same concept, in embodiments of the present disclosure, an electronic device is also provided.

It can be understood that, in order to realize the above-mentioned functions, the electronic device provided in the embodiments of the present disclosure includes hardware structures and/or software components corresponding to each function. In combination with the units and algorithm steps of the respective examples disclosed in the embodiments of the present disclosure, the embodiments of the present disclosure can be implemented in the form of hardware or a combination of hardware and computer software. Whether a function is executed by hardware or computer software-driven hardware depends on the specific application and design constraints of the technical solution. Those skilled in the art can use different methods for each specific application to implement the described functions, but such implementation should not be considered as going beyond the scope of the technical solutions of the embodiments of the present disclosure.

Figure 8:
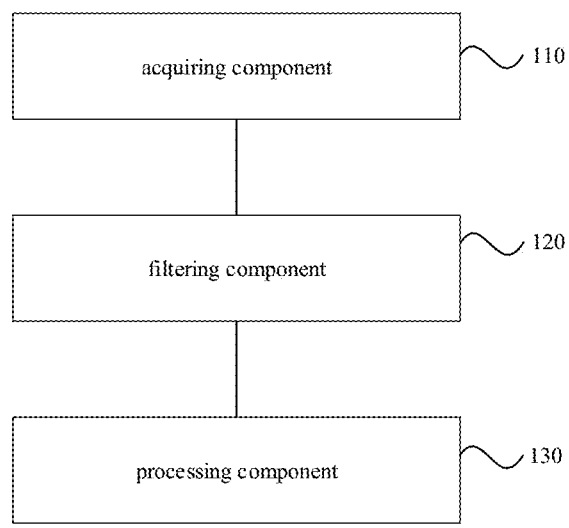
FIG. 8 is a block diagram showing an electronic device according to some embodiments.

FIG. 8 is a block diagram showing an electronic device according to some embodiments. Referring to FIG. 8, the electronic device includes an acquiring component 110, a filtering component 120 and a processing component 130. Each component will be described separately below.

The acquiring component 110 is configured to: acquire, in response to obtaining an image capturing operation triggered by a user prior to taking off, image frames within a designated duration, upon entering a take-off capture mode.

The filtering component 120 is configured to: filter at least one designated image frame based on the acquired image frames. Herein, the designated image frame is the image frame where the user is at the take-off high point within the designated duration.

The processing component 130 is configured to: perform an image capturing operation and output a take-off capture image based on the designated image frame, when an acquiring time period does not reach the designated duration but the designated image frame is filtered based on the acquired image frames, or when an acquiring time period reaches the designated duration.

In some embodiments of the present disclosure, the designated image frame includes at least two image frames, and the at least two image frames include: a first number of image frames in order of take-off high points from high to low, in multiple image frames; or an image frame where the user is at the highest point of take-off and a second number of image frames adjacent to the image frame where the user is at the highest point of take-off, in the multiple image frames; or a third number of image frames adjacent to the image frame where the user is at the highest point of take-off, in the multiple image frames. Herein, the processing component 130 is also used to: synthesize and output the take-off capture image based on at least two image frames.

In some embodiments of the present disclosure, the filtering component 120 is configured to: cache the acquired image frames to a face recognition cache region and an original image buffer; and invoke, in response to caching newly acquired image frames in the face recognition cache region and/or the original image buffer, a sliding frame-selection algorithm to filter the designated image frame with designated sliding windows.

In some embodiments of the present disclosure, the filtering component 120 is configured to: perform content recognition on the image frames in each sliding window in turn, and obtain coordinate information of corresponding content; and use, in response to obtaining a peak coordinate representing the highest take-off height based on the coordinate information within the designated duration, an image frame corresponding to the peak coordinate, and/or a designated number of image frames adjacent to the image frame corresponding to the peak coordinate as the designated image frame; or, use, in response to not obtaining a peak coordinate representing the highest take-off height based on the coordinate information within the designated duration, an image frame in the latest sliding window as the designated image frame.

In some embodiments of the present disclosure, the filtering component 120 is configured to: perform a tracking recognition of human body on the image frames in each sliding window, and/or perform a predetermined part recognition of human body on the image frames in each sliding window.

In some embodiments of the present disclosure, the predetermined part includes human eyes and/or human face.

In some embodiments of the present disclosure, the processing component 130 is configured to: synthesize the designated image frame through a multi-frame noise reduction algorithm and output the take-off capture image.

In some embodiments of the present disclosure, the electronic device further includes an exposure table adjustment component. Herein, the exposure table adjustment component is configured to: reduce an exposure table corresponding to standard exposure parameters of a current image capturing scene, prior to entering the take-off capture mode to start acquiring the image frames.

In some embodiments of the present disclosure, the electronic device further includes a cache component. Herein, the cache component is configured to: display and cache preview pictures in real time, in response to entering the take-off capture mode.

With respect to the apparatus in the above embodiments, the specific implementations for performing operations by individual components therein have been described in detail in the embodiments regarding the methods, which will not be elaborated herein.

Figure 9:
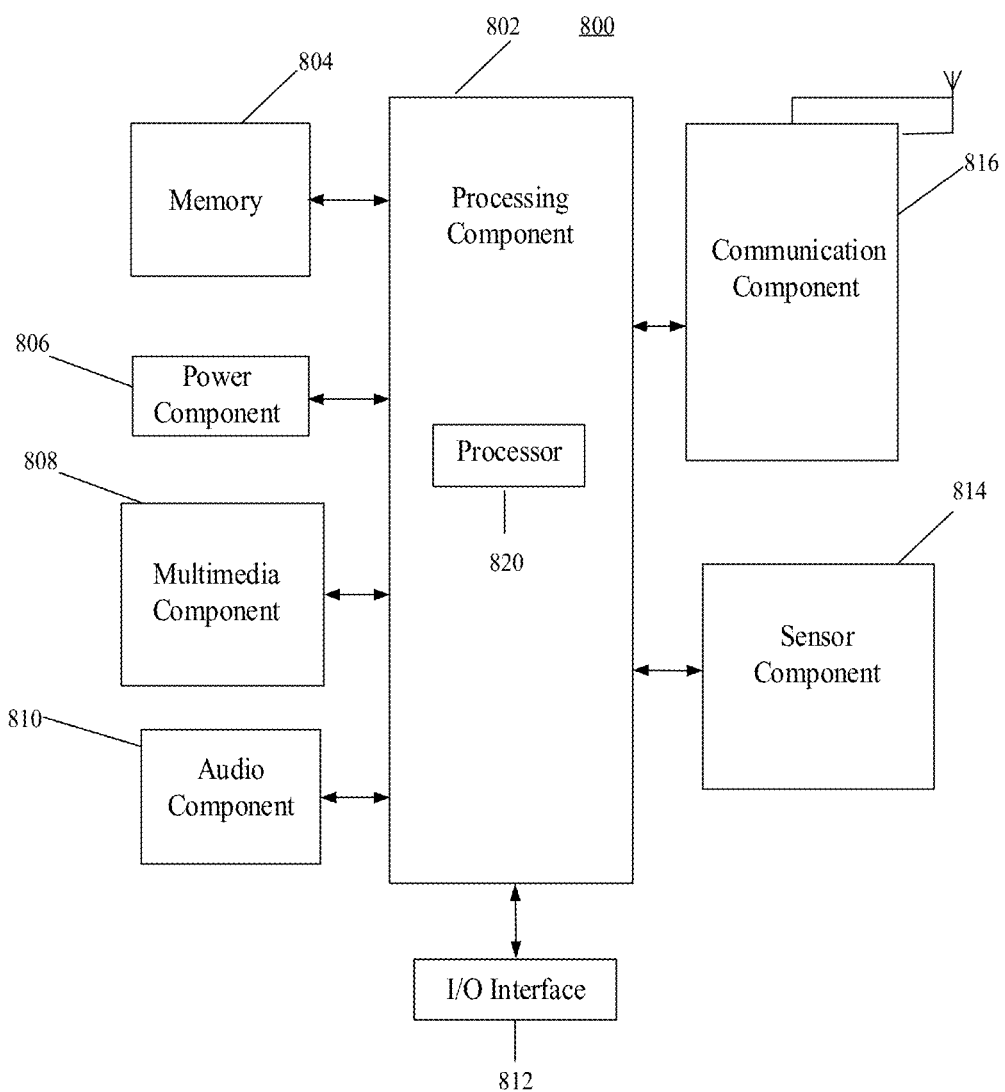
FIG. 9 is a block diagram showing a device for take-off capturing according to some embodiments.

FIG. 9 is a block diagram showing a device 800 for take-off capturing according to some embodiments. For example, the device 800 for take-off capturing can be a mobile phone, a computer, a digital broadcast terminal, a messaging device, a gaming console, a tablet, a medical device, exercise equipment, a personal digital assistant, and the like.

Referring to FIG. 9, the device 800 for take-off capturing can include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800 for take-off capturing, such as the operations associated with display, telephone calls, data communications, camera operations, and recording operations. The processing component 802 can include one or more processors 820 to execute instructions to perform all or part of the steps in the above described methods. Moreover, the processing component 802 can include one or more modules which facilitate the interaction between the processing component 802 and other components. For instance, the processing component 802 can include a multimedia module to facilitate the interaction between the multimedia component 808 and the processing component 802.

The memory 804 is configured to store various types of data to support the operation of the device 800 for take-off capturing. Examples of such data include instructions for any applications or methods operated on the device 800 for take-off capturing, contact data, phonebook data, messages, pictures, video, etc. The memory 804 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800 for take-off capturing. The power component 806 can include a power management system, one or more power sources, and any other components associated with the generation, management, and distribution of power in the device 800 for take-off capturing.

The multimedia component 808 includes a screen providing an output interface between the device 800 for take-off capturing and the user. In some embodiments, the screen can include a liquid crystal display (LCD) and a touch panel (TP). In some implementations, an organic light-emitting diode (OLED) display can be employed.

If the screen includes the touch panel, the screen can be implemented as a touch screen to receive input signals from the user. The touch panel includes one or more touch sensors to sense touches, swipes, and gestures on the touch panel. The touch sensors not only can sense a boundary of a touch or swipe action, but also can sense a period of time and a pressure associated with the touch or swipe action. In some embodiments, the multimedia component 808 includes a front camera and/or a rear camera. The front camera and/or the rear camera can receive an external multimedia datum while the device 800 for take-off capturing is in an operation mode, such as a photographing mode or a video mode. Each of the front camera and the rear camera can be a fixed optical lens system or have focus and optical zoom capability.

The audio component 810 is configured to output and/or input audio signals. For example, the audio component 810 includes a microphone ("MIC") configured to receive an external audio signal when the device 800 for take-off capturing is in an operation mode, such as a call mode, a recording mode, and a voice recognition mode. The received audio signal can be further stored in the memory 804 or transmitted via the communication component 818. In some embodiments, the audio component 810 further includes a speaker to output audio signals.

The I/O interface 812 provides an interface between the processing component 802 and peripheral interface modules, such as a keyboard, a click wheel, buttons, and the like. The buttons can include, but are not limited to, a home button, a volume button, a starting button, and a locking button.

The sensor component 814 includes one or more sensors to provide status assessments of various aspects of the device 800. For instance, the sensor component 814 can detect an open/closed status of the device 800 for take-off capturing, relative positioning of components such as the display and the keypad, of the device 800 for take-off capturing, a change in position of the device 800 for take-off capturing or a component of the device 800 for take-off capturing, a presence or absence of user contact with the device 800 for take-off capturing, an orientation or an acceleration/deceleration of the device 800 for take-off capturing, and a change in temperature of the device 800 for take-off capturing. The sensor component 814 can include a proximity sensor configured to detect the presence of nearby objects without any physical contact. The sensor component 814 can also include a light sensor, such as a CMOS or CCD image sensor, for use in imaging applications. In some embodiments, the sensor component 814 can also include an accelerometer sensor, a gyroscope sensor, a magnetic sensor, a pressure sensor, or a temperature sensor.

The communication component 816 is configured to facilitate wired or wireless communication between the device 800 for take-off capturing and other devices. The device 800 for take-off capturing can access a wireless network based on a communication standard, such as Wi-Fi, 2G, 3G, 4G, 5G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the device 800 for take-off capturing can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 804, executable by the processor 820 in the device 800 for take-off capturing, for performing the above-described methods. For example, the non-transitory computer-readable storage medium can be a ROM, a random access memory (RAM), a CD-ROM, a magnetic tape, a floppy disc, an optical data storage device, and the like.

Various embodiments of the present disclosure can have one or more of the following advantages.

According to the take-off capture method provided by the present disclosure, the take-off capture mode is entered and image frames are acquired, in response to obtaining an image capturing operation triggered by an user prior to taking off, the designated image frames are filtered based on the acquired image frames, and the take-off capture image is output based on the designated image frames. As the take-off capture image is determined based on the designated image frames filtered out in the take-off capture mode, it can be ensured that the take-off capture image is an image with the best take-off posture captured by the user during the take-off process, thereby ensuring that the users can easily and quickly obtain the take-off capture image with the best take-off posture.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or retracted from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A take-off capture method, comprising:
    acquiring by an electronic device, in response to obtaining an image capturing operation triggered by a user prior to taking off, image frames within a designated duration, upon entering a take-off capture mode;
    filtering by the electronic device at least one designated image frame based on the acquired image frames, the designated image frame being an image frame where the user is at a take-off high point within the designated duration; and
    performing by the electronic device an image capturing operation and outputting a take-off capture image based on the designated image frame, when an acquiring time period does not reach the designated duration but the designated image frame is filtered based on the acquired image frames,
    wherein the take-off capture image is an original image of the acquired image frame.

2. The take-off capture method according to claim 1, wherein the designated image frame comprises at least two image frames, and the at least two image frames comprise at least one of:
    a first number of image frames in order of take-off high points from high to low, in multiple image frames;
    an image frame where the user is at a highest point of take-off and a second number of image frames adjacent to the image frame where the user is at the highest point of take-off, in the multiple image frames; and
    a third number of image frames adjacent to the image frame where the user is at the highest point of take-off, in the multiple image frames; and
    wherein the outputting a take-off capture image based on the designated image frame comprises:
    synthesizing and outputting the take-off capture image, based on the at least two image frames.

3. The take-off capture method according to claim 1, wherein said filtering the designated image frame based on the acquired image frames comprises:
    caching the acquired image frames to a face recognition cache region and an original image buffer; and
    invoking, in response to caching newly acquired image frames in the face recognition cache region and/or the original image buffer, a sliding frame-selection algorithm to filter the designated image frame with designated sliding windows.

4. The take-off capture method according to claim 3, wherein the filtering the designated image frame with designated sliding windows comprises:
    performing content recognition on the image frames in each sliding window in turn, and obtaining coordinate information of corresponding content; and
    performing at least one of:
    determining, in response to obtaining a peak coordinate representing a highest take-off height based on the coordinate information within the designated duration, an image frame corresponding to the peak coordinate, and/or a designated number of image frames adjacent to the image frame corresponding to the peak coordinate as the designated image frame;
    and
    determining, in response to not obtaining a peak coordinate representing the highest take-off height based on the coordinate information within the designated duration, an image frame in the latest sliding window as the designated image frame.

5. The take-off capture method according to claim 4, wherein the performing content recognition on the image frames in each sliding window comprises at least one of:
    performing a tracking recognition of human body on the image frames in each sliding window; and
    performing a predetermined part recognition of human body on the image frames in each sliding window.

6. The take-off capture method according to claim 5, wherein the predetermined part includes human eyes and/or human face.

7. The take-off capture method according to claim 1, wherein the outputting a take-off capture image based on the designated image frame comprises:
synthesizing the designated image frame through a multi-frame noise reduction algorithm and outputting the take-off capture image.

8. The take-off capture method according to claim 1, further comprising:
reducing an exposure table corresponding to standard exposure parameters of a current image capturing scene, prior to entering the take-off capture mode to start acquiring the image frames.

9. The take-off capture method according to claim 1, further comprising:
displaying and caching preview pictures in real time, in response to entering the take-off capture mode.

10. A non-transitory computer-readable storage medium having instructions stored thereon for execution by a processor of a mobile terminal, to enable the mobile terminal to execute steps of the take-off capture method according to claim 1.

11. An electronic device, comprising:
a processor; and
a memory for storing instructions executable by the processor;
wherein the processor is configured to:
acquire, in response to obtaining an image capturing operation triggered by a user prior to taking off, image frames within a designated duration, upon entering a take-off capture mode;
filter at least one designated image frame based on the acquired image frames, the designated image frame being an image frame where the user is at a take-off high point within the designated duration; and
perform an image capturing operation and output a take-off capture image based on the designated image frame, when an acquiring time period does not reach the designated duration but the designated image frame is filtered based on the acquired image frames,
wherein the take-off capture image is an original image of the acquired image frame.

12. The electronic device according to claim 11, wherein the designated image frame comprises at least two image frames, and the at least two image frames comprise at least one of:
a first number of image frames in order of take-off high points from high to low, in multiple image frames;
an image frame where the user is at a highest point of take-off and a second number of image frames adjacent to the image frame where the user is at the highest point of take-off, in the multiple image frames; and
a third number of image frames adjacent to the image frame where the user is at the highest point of take-off, in the multiple image frames; and
the processor is further configured to:
synthesize and output the take-off capture image, based on the at least two image frames.

13. The electronic device according to claim 11, wherein the processor is further configured to:
cache the acquired image frames to a face recognition cache region and an original image buffer; and
invoke, in response to caching newly acquired image frames in the face recognition cache region and/or the original image buffer, a sliding frame-selection algorithm to filter the designated image frame with designated sliding windows.

14. The electronic device according to claim 13, wherein the processor is further configured to:
perform content recognition on the image frames in each sliding window in turn, and obtain coordinate information of corresponding content; and
perform at least one of:
determining, in response to obtaining a peak coordinate representing a highest take-off height based on the coordinate information within the designated duration, an image frame corresponding to the peak coordinate, and/or a designated number of image frames adjacent to the image frame corresponding to the peak coordinate as the designated image frame;
and
determining, in response to not obtaining a peak coordinate representing the highest take-off height based on the coordinate information within the designated duration, an image frame in the latest sliding window as the designated image frame.

15. The electronic device according to claim 14, wherein the processor is further configured to perform at least one of:
a tracking recognition of human body on the image frames in each sliding window; and
a predetermined part recognition of human body on the image frames in each sliding window.

16. The electronic device according to claim 15, wherein the predetermined part includes human eyes and/or human face.

17. The electronic device according to claim 11, wherein the processor is further configured to:
synthesize the designated image frame through a multi-frame noise reduction algorithm and output the take-off capture image.

18. The electronic device according to claim 11, wherein the processor is further configured to:
reduce an exposure table corresponding to standard exposure parameters of a current image capturing scene, prior to entering the take-off capture mode to start acquiring the image frames.

19. The electronic device according to claim 11, wherein the processor is further configured to:
display and cache preview pictures in real time, in response to entering the take-off capture mode.

20. The electronic device according to claim 11, wherein the take-off capture image is determined based on the designated image frames filtered out in the take-off capture mode to thereby ensure that the take-off capture image is an optimal image with an optimal take-off posture captured by the user during the take-off process.

* * * * *